United States Patent
Fales

[15] 3,665,383
[45] May 23, 1972

[54] VEHICLE CONDITION RESPONSIVE MONITORING SYSTEM HAVING PRIORITY INDICATION

[72] Inventor: Douglas I. Fales, Flint, Mich.
[73] Assignee: General Motors Corporation, Detroit, Mich.
[22] Filed: Nov. 20, 1970
[21] Appl. No.: 91,490

[52] U.S. Cl............................................340/52 F, 340/181
[51] Int. Cl. ......................................................G08b 19/00
[58] Field of Search...................340/52, 52 F, 177, 181, 195, 340/197

[56] References Cited

UNITED STATES PATENTS 3,283,314  11/1966  Stewart..............................340/177 X
3,302,191  1/1967  Ziegler...................................340/177

Primary Examiner—Alvin H. Waring
Attorney—J. L. Carpenter and Paul Fitzpatrick

[57] ABSTRACT

Apparatus for providing information as to plurality of conditions using a single air core gauge. Each condition being monitored controls a switch that in turn controls the energization of at least one winding, the magnetic fields generated by the windings forming a resultant magnetic field that controls the orientation of an indicia-bearing rotatable disc. When one or more windings are energized a lamp illuminates the indicia which the disc locates at a certain position so as to indicate the status of the condition which caused energization of the winding. The apparatus also gives priority to information on conditions which are of greater importance than other conditions also being monitored.

3 Claims, 6 Drawing Figures

Patented May 23, 1972 3,665,383

INVENTOR.
Douglas I. Fales
BY
Paul Fitzpatrick
ATTORNEY

INVENTOR.
Douglas I. Fales
BY
Paul Fitzpatrick
ATTORNEY

VEHICLE CONDITION RESPONSIVE MONITORING SYSTEM HAVING PRIORITY INDICATION

This invention relates to apparatus which advises as to the status of a plurality of conditions at various remote locations and, more particularly, to motor vehicle systems for monitoring a plurality of conditions at various remote locations in a motor vehicle and for indicating the status of the conditions being monitored. This invention also relates to my copending applications Ser. Nos. 91,491 and 91,393 which were filed on Nov. 20, 1970, and assigned to the assignee of this invention.

Many warning systems for advising of conditions in a motor vehicle are presently in widespread use. These systems may, for example, be employed to monitor fuel level in a gas tank, coolant level in a radiator, oil pressure in an engine crankcase, or the charging of a battery by an electrical generating system. Generally these prior systems are of two types: they either provide a continuous indication of the condition being monitored, the well-known fuel gauge being one example, or they advise the vehicle occupant only of a condition which has changed to such an extent as to need his attention, as is the case with lamps which are employed as telltales. In either event, these systems have had to compete for space with many other devices which must also be located in a vehicle dashboard so as to be within reach and observation of the vehicle operator. Since the motoring public is provided an opportunity to enjoy an ever-increasing number of comfort and convenience features offered by vehicle manufacturers, the space limitations in vehicle dashboards are continuously becoming more acute.

Accordingly, it is an object of this invention to provide apparatus which monitors a large number of conditions in a motor vehicle and which employs a single dashboard unit to convey information regarding the various monitored conditions to the vehicle operator.

A further object of this invention is the implementation of a single air core gauge to monitor a plurality of conditions at various locations in a motor vehicle.

Another object of this invention is the provision of an air core gauge which indicates a plurality of conditions in a motor vehicle and which only provides an affirmative indication as to the status of the monitored conditions which the attention of the vehicle operator to one or more of the conditions is required.

It is yet another object of this invention to provide apparatus for monitoring a plurality of conditions in a vehicle and which advises a vehicle operator of the most urgent condition regardless of other conditions being monitored that may also require his attention.

The satisfaction of the foregoing objects and the advantages of the subject invention will be apparent from the accompanying description and drawings, in which.

Figures 1, 2, 3, 4:
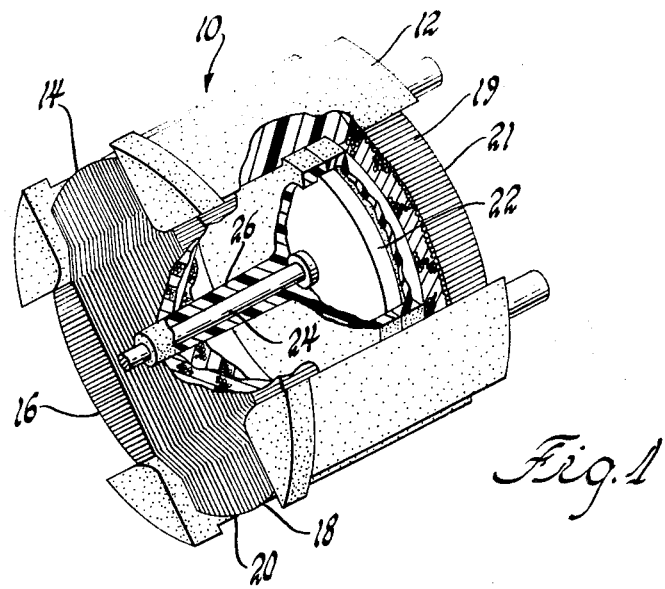
FIG. 1 depicts an air core gauge of the prior art which may be employed in practicing the subject invention.
FIG. 2 is a perspective view, with parts broken away, of an indicator embodying the principles of the subject invention.
FIG. 3 is a cross-sectional view of the indicator in FIG. 1.
FIG. 4 is a schematic representation of an indicator circuit according to the principles of the subject invention.

Referring now to the drawings, FIG. 1 shows an air core gauge 10 of the type disclosed in Ziegler, U.S. Pat. No. 3,302,191, which may be employed in practicing the subject invention. As shown in FIG. 1, the gauge 10 includes a winding support member 12 on which are disposed first and second coils 14 and 16. The first coil 14 includes a first set of coaxial windings 18 and 20 and the second coil includes a second set of coaxial windings 19 and 21, the windings 18 through 20 in the coils 14 and 16 being positioned and wound so as to generate magnetic fields when energized that oppose each other. The winding support member 12 supports the coils 14 and 16 so that their respective axes are substantially at 90 degrees to each other, which causes the magnetic fields produced by the windings 18 through 21 to combine in a resultant magnetic field in which the magnetic fields of the opposed windings are cancelled when the opposed winding are equally energized. In addition, the gauge 10 also includes a permanent magnet armature 22 rotatably supported by a shaft 24 that is restrained in a guideway 26.

As shown in FIGS. 2 and 3, an indicator 28 according to the preferred and illustrated embodiment includes the gauge 10 of FIG. 1 disposed with the shaft 24 vertical and drivably connected to a rotatable disc 30, which has a depending edge 32, so as to rotate the disc 30 in accordance with the energization of the windings 18 through 21. A plurality of windows 34 through 37 which bear indicia are disposed in the depending edge 32 of the disc 30 so as to be aligned with a light source, such as a lamp 38, that is mounted in a shroud 40 behind the depending edge 32 of the disc 30. The lamp 38 and the winding support member 12 are held in a fixed relative position by suitable supporting apparatus, such as a bracket 42 illustrated in FIG. 3.

Accordingly, as a condition which is being monitored effects a change in the energization of the windings 18 through 21 the corresponding change in the resultant magnetic field causes the armature 22 to rotate to a new position in which one of the windows 34 through 37 and the indicia which it bears is aligned with the lamp 38. Upon energization of the lamp 38 the window is illuminated by the lamp 38 and the vehicle occupant is made aware of the change in the condition being monitored.

For example, if it is assumed that the lamp 38 and the windings 18 through 21 are all normally de-energized and that one of the windings 18 through 21 is responsive to the temperature of the vehicle engine, the lamp 38 is normally de-energized and the vehicle operator is therefore not affirmatively advised of any malfunction of the conditions being monitored in the vehicle. That is, so long as the lamp 38 remains de-energized he may assume that the conditions being monitored are functioning normally. However, should the engine temperature exceed a predetermined level the winding with which it is associated will be immediately energized and at a predetermined time after the winding is energized the lamp 38 will be energized, as will subsequently be explained. Accordingly, the disc 30 is first rotated so as to align the window 36, on which is the indicia HOT, with the lamp 38 and then the lamp 38 is energized. Upon energization of the lamp 38 the vehicle operator is advised of the overheated condition of the engine.

A control circuit 44 for controlling the energization of the windings 18 through 21 and the lamp 38 is schematically illustrated in FIG. 4. As shown in FIG. 4, several detection networks 46 through 49 are provided for monitoring various conditions in a vehicle. Each detection network 46 through 49 includes one of a plurality of normally open switches 50 through 53 connected in series with one of the respective windings 18 through 21. Power is supplied to the windings 18 through 21 by a suitable power source, such as a vehicle battery 54, through a power switch, such as a vehicle ignition switch 56, in accordance with the setting of the switches 50 through 53. A resistor 58 is connected in series with the windings 18 through 21 and the battery 54 so as to form a voltage divider in which the common junction 60 of the windings 18 through 21 undergoes a wide voltage excursion in accordance with the energization of the windings 18 through 21, the voltage excursion being sensed by a PNP transistor 62 which controls the energization of the lamp 38.

So long as all the switches 50 through 53 are open, substantially the entire voltage of the battery 54 is applied through the ignition switch 56 and the resistor 58 to the common junction 60 of the windings 18 through 21. Accordingly, the base 64 of the transistor 62, which is connected to the junction 60, is at substantially the same voltage as the emitter 66 of the transistor 62 so the transistor 62 is biased to its non-conductive condition. The transistor 62 thus normally prevents energization of the lamp 38, which is in series with the collector 68 of the transistor 62.

However, should one of the switches 50 through 53, such as the switch 52, be closed due, for example, to an overheated engine, the junction 60 of the windings 18 through 21 would be at a relatively low potential that is established by the voltage divider action of the resistor 58 in series with the winding 20. Since the resistance of the winding 20 is relatively small, the base 64 of the transistor 62 would thus be at a much lower voltage than the emitter 66 and the forward biased base-emitter junction of the transistor 62 makes the transistor 62 conductive so as to energize the lamp 38. Accordingly, the energization of the winding 20 causes the disc 30 to be rotated so as to align the window 36 with the lamp 38 and the energization of the lamp 38 illuminates both the window 36 and the indicia which it contains so as to advise the vehicle operator that the overheated engine needs his attention.

It should be noted that the time constant formed by the resistor 58 and one of the windings 18 through 21 when the corresponding switch of the switches 50 through 53 is closed provides a valuable time delay in the operation of the indicator 28. Since the disc 30 in all probability is not aligned with the lamp 38 for a proper indication the moment one of the switches 50 through 53 is closed, the disc 30 begins to rotate as soon as one of the windings 18 through 21 is energized. If the lamp 38 also were immediately energized when one of the windings 18 through 21 becomes energized the indicator 28 may give an initial indication that is erroneous due to the motion of the disc 30. Accordingly, the windings 18 through 21 and the resistor 58 are selected so that the voltage at the junction 60 is decreased at a sufficiently slow rate when one of the switches 50 through 53 is closed as to introduce a certain time delay into the control circuit 44.

By properly selecting the windings 18 through 21 and the resistor 58 the junction 60 voltage is maintained at a sufficiently high voltage as to maintain the transistor 62 nonconductive until an energized winding has aligned the disc 30 for a proper indication of the malfunction. The disc 30 is thus always properly aligned before the lamp 38 is energized. As persons versed in the art will appreciate, various other time delay circuitry could also be employed to further delay the energization of the lamp 38 after closure of one of the switches 50 through 53. Indeed, the lamp 38 may be selected to be of a type in which the lamp is not illuminated for a certain time after the lamp is energized. A "slow lamp," as these lamps are sometimes called, would preclude false indications by the indicator 28 before the disc 30 is properly aligned and would therefore eliminate the need for additional time delay apparatus.

Figure 5:
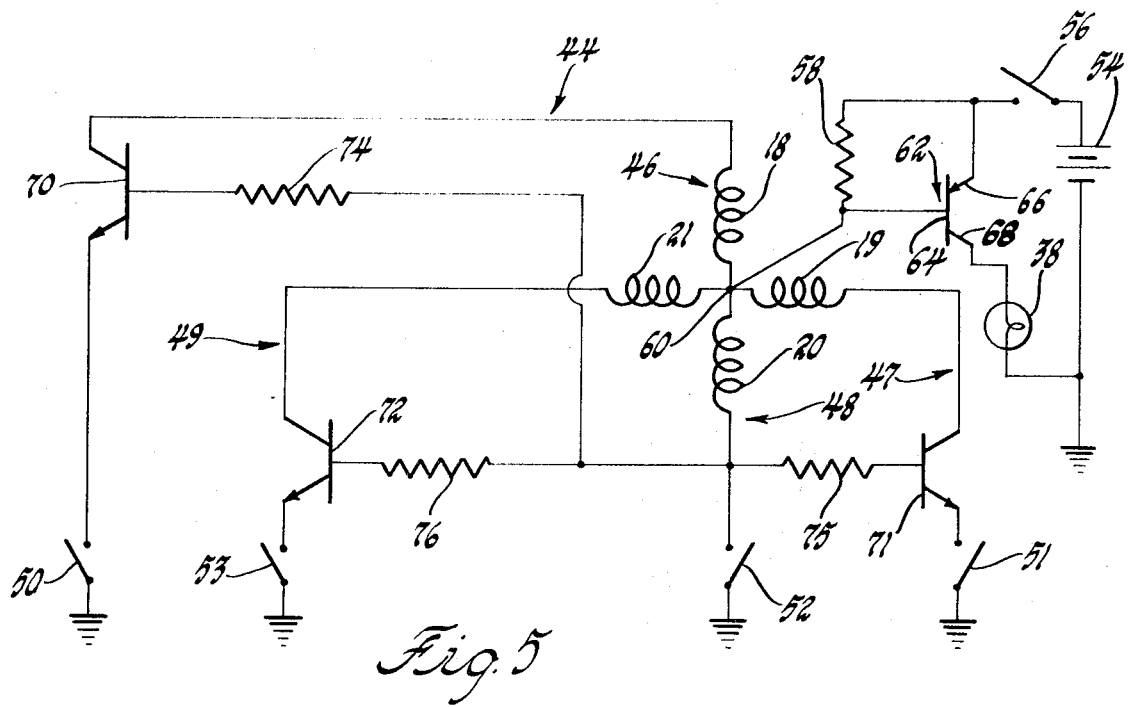
FIG. 5 is a modification of the indicator circuit in FIG. 4 having provision for a single priority condition.

In the embodiment illustrated in FIG. 5, the control circuit 44 of FIG. 4 has been modified to provide a priority of signals in accordance with the importance which the vehicle operator attaches to the various conditions being monitored. Since it is most likely that only a single malfunction, if any, will ever occur in a vehicle at a given time the embodiments previously discussed, which operate properly only in response to closure of a single switch, are normally quite satisfactory. However, if the vehicle operator attaches great importance to a certain condition it is important that he be advised of changes in that condition regardless of simultaneous but less urgent malfunctions which may be present in the vehicle.

To this end transistors 70 through 72 have been inserted in the detection networks 46, 47, and 49 in FIG. 5 to render nonconductive the detection networks 46, 47, and 49 when the switch 52 is closed in response to a malfunction of utmost urgency, such as low oil pressure in the vehicle engine. Suitable bias resistors 74 through 76 connect the bases of the respective transistors 70 through 72 to the switch 52 so that when the switch 52 is closed in response to low oil pressure in the vehicle engine the bases of the transistors 70 through 72 are placed at ground potential. Since closure of one of the other switches 50, 51, or 53 merely grounds the emitter of the corresponding transistors 70 through 72 it is impossible for the transistors 70 through 72 to be conductive if the switch 52 is closed. Closure of the switch 52 thus effects energization of the winding 20 and the lamp 38 in the fashion previously described and also prevents energization of any of the other windings 18, 19, or 21 regardless of whether any of the switches 50, 51, or 53 are closed.

For example, if the switch 51 is closed due to a malfunction in the condition which it monitors, such as the vehicle's electrical generating system, the vehicle could still be operated for a short distance as the battery 54 will temporarily meet the vehicle's electrical energy requirements. Though the vehicle will continue operating the vehicle operator will be advised of the malfunction in the electrical generating system because closure of the switch 51 grounds the emitter of the transistor 71 while the base of the transistor 71 is at a much higher potential due to the leakage of a small current through the winding 20 and the resistor 75. The base-emitter junction of the transistor 71 is thus forward biased so as to render the transistor 71 conductive and energize the winding 19. Since the current through the winding 20 and the base of the transistor 71 is very small the winding 20 remains substantially deenergized and the entire resultant magnetic field which is generated is due to the energization of the winding 19. The disc 30 will thus be rotated and the lamp 38 will be energized so as to indicate the vehicle operator the malfunction in the electrical generating system in the fashion previously described.

However, upon closure of the switch 52 due to low oil pressure in the engine the vehicle operator should stop the engine immediately to prevent its being damaged. Accordingly, closure of the switch 52 grounds the winding 20 and the base of the transistor 71 so as to energize the winding 20 and switch off the transistor 71. The energization of the winding 20 and de-energization of the winding 19 thus causes the indicator 28 to advise the vehicle operator of the most important malfunction, i.e., low oil pressure, immediately regardless of other malfunctions which may exist in the vehicle.

Figure 6:
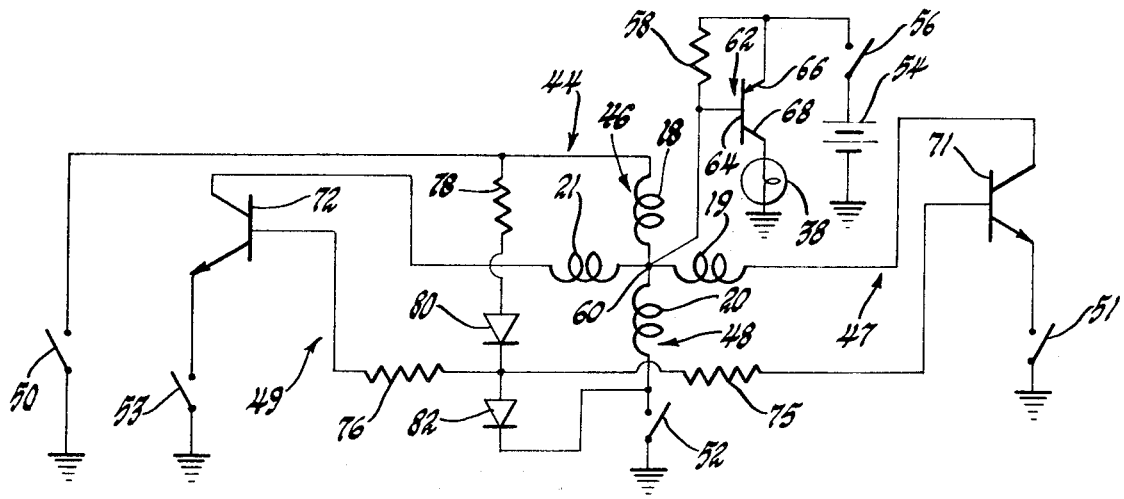
FIG. 6 is a modification of the indicator circuit in FIG. 5 having provision for a multiplicity of priority conditions.

In FIG. 6 the single priority control circuit 44 of FIG. 5 has been modified to give equal priority to each of two conditions through the addition of a resistor 78 and a pair of steering diodes 80 and 82 and the deletion of the transistor 70 and the resistor 74. In FIG. 6 closure of the switches 51 or 53 causes the indicator 28 to provide the same indication as in the embodiment of FIG. 5 through energization of the corresponding windings 19 or 21. That is, upon closure of the switch 51 the emitter of the transistor 71 is grounded while a voltage is applied to the base of the transistor 71 through a current path from the junction 60 which includes the winding 18, the resistor 78, and the diode 80. Though the current thus applied to the base of the transistor 71 is sufficient to turn on the transistor 71 it is insufficient to energize the winding 18 and the resultant magnetic field generated is thus substantially produced by the energization of the winding 19 when the transistor 71 becomes conductive. Similarly, upon closure of the switch 53 the emitter of the transistor 72 is grounded while the base of the transistor 72 is provided sufficient current through the winding 18, the resistor 78, the diode 80, and the resistor 76 to turn on the transistor 72 and effect energization of the winding 21.

However, if the switch 52 is closed it grounds the winding 20, causing the winding 20 to become energized. In addition, the closed switch 52 grounds the bases of the transistors 71 and 72 through the diode 82. Since the transistors 71 and 72 cannot be conductive when their bases are grounded regardless of whether the switches 51 and 53 are closed the transistors 71 and 72 are thus held nonconductive whenever the switch 52 is closed.

Similarly, closure of the switch 50 grounds the winding 18 so as to effect energization of the winding 18. Since the switch 50 also grounds the resistor 78 the supply of base current to the transistors 71 and 72 is interrupted so long as the switch 50 is closed. Accordingly, closure of the switch 50 will also prevent energization of the windings 19 and 21 while energizing the winding 18.

The control circuit 44 thus provides equal priority to indicating changes in the conditions being monitored which effect closure of the switches 50 and 52. While persons versed in the art will appreciate that some minute currents pass through the winding 18 when one of the switches 51, 52, or 53 are closed it should be emphasized that proper selection of the resistor 78 reduces these currents to a value sufficiently low as to be of negligible effect on the operation of the indicator 28.

It is thus apparent that the aforedescribed apparatus is not only capable of monitoring several conditions by using a single air core gauge but also is able to attach greater priority to certain of the conditions than to the other conditions, though persons versed in the art will appreciate that many modifications of this apparatus in addition to those herein described may be made without departing from the spirit of this invention.

What is claimed is:

1. Apparatus for indicating the status of a plurality of conditions comprising, in combination, a plurality of detection networks each including a normally open switch that is responsive to at least one of the conditions being monitored and a winding connected in series circuit with the normally open switch, each of the windings being effective when energized to generate a magnetic field along its axis, the axes of the windings being disposed at predetermined angles to each other, at least one of the detection networks also including a controlled switch in the series circuit with the normally open switch and the winding in the detection network, the controlled switch being responsive to the normally open switch in another detection network whereby the controlled switch prevents the energization of the winding in series circuit therewith when the normally open switch in the other detection network is closed and permits energization of the winding in series circuit therewith when the normally open switch in the other detection network is open, means for connecting the detection networks to a power source effective to energize one of the windings when the normally open switch in series circuit therewith is closed, thereby generating the magnetic field along its axis, and means responsive to the orientation of the magnetic field for indicating which of the conditions being monitored has changed sufficiently to close one of the normally open switches.

2. Apparatus for indicating the status of a plurality of conditions comprising, in combination, a plurality of detection networks each including a normally open switch that is responsive to one of the conditions being monitored for detecting changes in the monitored condition, each of the switches being closed upon a predetermined change in the condition being monitored by the switch, and a winding connected in series with the switch and effective when energized to produce a magnetic field along the axis of the winding, the axes of the windings being aligned at predetermined angles to each other; a controlled switch in series circuit with at least one of the detection networks and responsive to closure of the switch in one of the other detection networks so as to be conductive when the switch in the other detection network is open and nonconductive when the switch in the other detection network is closed; means for connecting the detection networks to a power source effective upon closure of a normally open switch to cause the energization by the power source of the winding in series circuit with the normally open switch, closure of each of the normally open switches which control a controlled switch also preventing energization of the windings in series circuit with the controlled switches by rendering the controlled switches nonconductive, thereby establishing priorities between the conditions being monitored; and indicating means for indicating the status of the conditions being monitored, the indicating means including an indicia bearing member, means for moving the indicia bearing member past a certain position in accordance with the magnetic field produced by the energization of one of the windings, a lamp for illuminating the indicia at the certain position, and means responsive to the energization of the windings effective to energize the lamp when a winding is energized and deenergize the lamp when the windings are deenergized whereby a change in the status of a certain condition being monitored effects illumination of predetermined indicia at the certain position.

3. Apparatus for indicating the status of a plurality of conditions comprising, in combination, a plurality of detection networks each including a switch for monitoring at least one of the conditions being monitored, each of the switches normally being in a first operative state and being changed to a second operative state upon a predetermined change in the condition being monitored by the switch, and a winding connected in series with the switch and effective when energized to produce a magnetic field along the axis of the winding, the axes of the windings being aligned at predetermined angles to each other, at least one of the detection networks also including a transistor in series with the winding and the switch, the control terminal of the transistor being connected to the switch in another detection network so as to bias the transistor to its conductive condition when the switch in said other detection network is in the first operative state and to its nonconductive condition when the switch in said other detection network is in the second operative state, thereby preventing energization of the winding in series with the transistor when the switch in said other detection network is in the second operative state while permitting the energization of the winding when the switch is in the first operative state, means for connecting the detection networks to a power source for effecting energization of the windings by the power source in response to placement of the switches in the second operative state, and indicating means for indicating the status of the conditions being monitored, the indicating means including an indicia bearing member, means for moving the indicia bearing member past a certain position in accordance with the magnetic field produced by the energization of one of the windings, a lamp for illuminating the indicia at the certain position, and means responsive to the energization of the windings effective to energize the lamp when a winding is energized and deenergize the lamp when the windings are deenergized whereby a change in the status of a certain condition being monitored effects illumination of predetermined indicia at the certain position in accordance with the priority of conditions being monitored.

* * * * *